United States Patent [19]

Anastos et al.

[11] Patent Number: 5,076,763
[45] Date of Patent: Dec. 31, 1991

[54] PUMP CONTROL RESPONSIVE TO TIMER, DELAY CIRCUIT AND MOTOR CURRENT

[75] Inventors: William N. Anastos, Belmont; Stephen B. Boyd, Arlington, both of Mass.

[73] Assignee: Rule Industries, Inc., Gloucester, Mass.

[21] Appl. No.: 593,333

[22] Filed: Oct. 1, 1990

Related U.S. Application Data

[63] Continuation of Ser. No. 195,462, May 16, 1988, abandoned, which is a continuation of Ser. No. 688,037, Dec. 31, 1984, abandoned.

[51] Int. Cl.⁵ .............................................. F04B 49/02
[52] U.S. Cl. ...................................... 417/44; 417/12; 417/36; 361/90; 318/474; 318/484
[58] Field of Search ................ 417/1, 12, 36, 44, 45, 417/53; 361/24, 28, 29, 31, 90; 318/474, 476, 484

[56] References Cited

U.S. PATENT DOCUMENTS

| | | | |
|---|---|---|---|
| 3,283,236 | 11/1966 | Legg | 318/474 X |
| 3,717,420 | 2/1973 | Rachocki | 417/12 |
| 3,776,661 | 12/1973 | Wohnlich | 417/12 |
| 3,858,102 | 12/1974 | Quinn | 318/474 |
| 3,953,777 | 4/1976 | McKee | 417/45 X |
| 4,021,700 | 5/1977 | Ellis-Anwyl | 361/24 X |
| 4,195,968 | 4/1980 | Emeny | 417/45 X |
| 4,241,299 | 12/1980 | Bertone | 318/474 |
| 4,311,438 | 1/1982 | Comstedt | 417/12 |
| 4,412,162 | 10/1983 | Kitamura | 318/484 X |
| 4,420,787 | 12/1983 | Tibbits et al. | 417/45 |
| 4,421,643 | 12/1983 | Frederick | 417/12 X |
| 4,473,338 | 9/1984 | Garmong | 417/12 |
| 4,505,643 | 3/1985 | Millis et al. | 417/12 |

FOREIGN PATENT DOCUMENTS 72678  5/1980  Japan .................................. 417/12

Primary Examiner—Richard A. Bertsch
Assistant Examiner—David W. Scheuermann
Attorney, Agent, or Firm—Fish & Richardson

[57] ABSTRACT

Disclosed herein is an apparatus and method for controlling electrically powered liquid-moving pumps, particularly bilge and sump pumps. The apparatus is characterized by the fact that no portion thereof need be located in the hostile environment of the bilge or sump served by the pump controlled thereby.

2 Claims, 1 Drawing Sheet

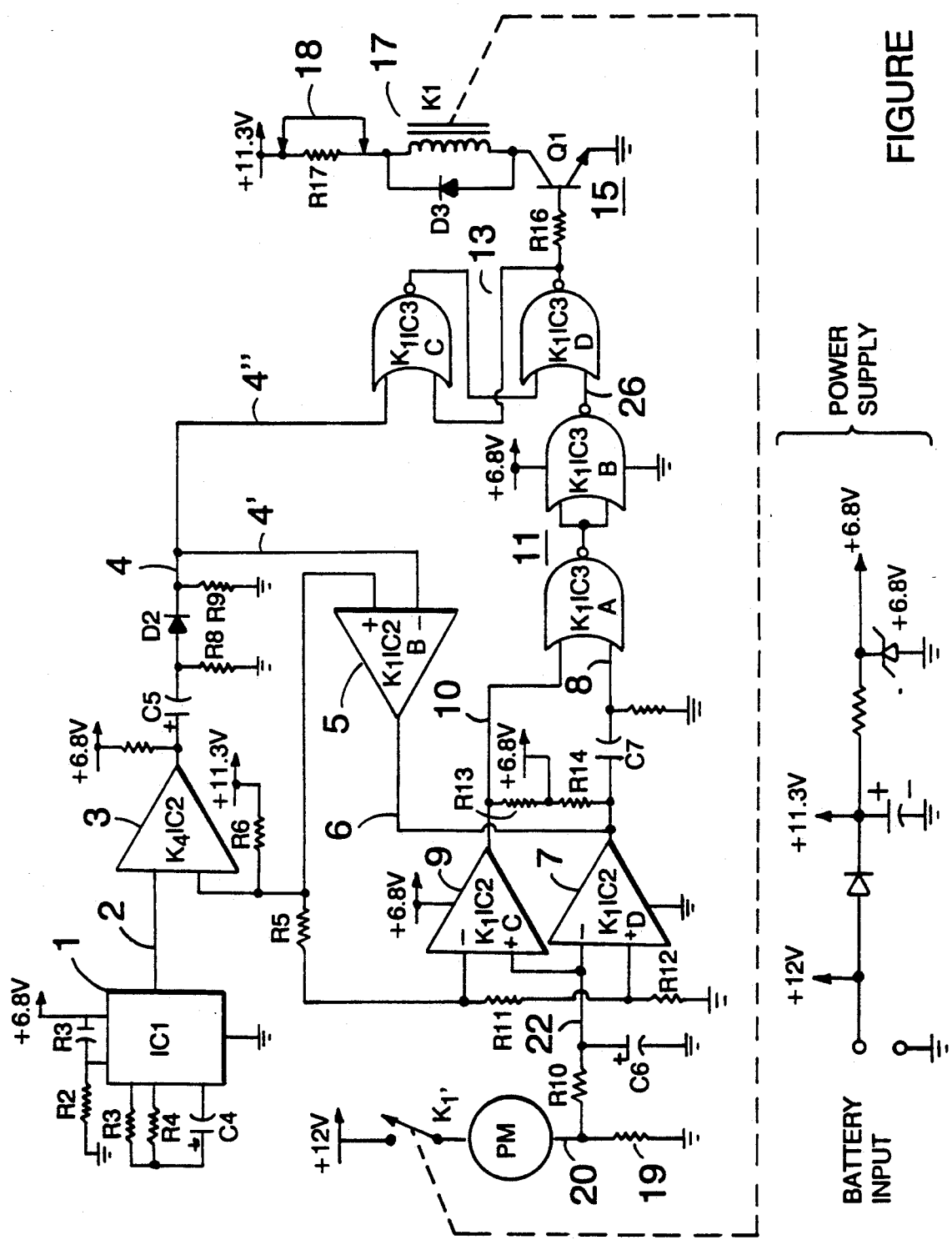

PUMP CONTROL RESPONSIVE TO TIMER, DELAY CIRCUIT AND MOTOR CURRENT

This is a continuation of copending application Ser. No. 07/195,462 filed on May 16, 1988 now abandoned, which is a continuation of Ser. No. 06/688,037 filed Dec. 31, 1984 now abandoned.

BACKGROUND OF THE INVNETION

The present invention relates broadly to an apparatus and method for controlling electrically powered pumps for liquids and is more specifically concerned with an apparatus and method for controlling the operations of bilge or sump pumps.

In a typical bilge pump installation the pump, powered by a fractional horsepower d.c. electric motor, is located at a low point in the bilge of the vessel and is wired to an appropriate source of electric power therefor, such as a battery or, in the case of power boats having electrical power generating capacity, to the electrical system of the boat. While control of the operation of such a pump may be undertaken manually, such as by the installation of a manually operated switch in the power supply circuit to the pump motor, it is usually desired that the pump be controlled automatically in response to water level changes in the bilge. To this end, various float switches are conventionally employed to control bilge pump operations, said switches broadly comprising a fixed base member and a float member which is usually, but not universally, pivotally attached to the base member. The float member carries a switching element, such as a mercury capsule, which is wired in series into the power supply circuit to the pump motor and which is responsive to the position of the float member relative to the base member. Such float switch devices are necessarily located in the bilge. In consequence of this arrangement, the switching element automatically makes or breaks the power supply circuit to the pump as a function of the position of the float member relative to the base member. Unfortunately, the bilges of vessels are normally dirty and often include chemicals such as cleansers, oils and greases as well as such solid particulates and fibrous adulterants as sand, grit, shells, fish scales, cordage, fishing line, paper and the like. Accordingly, the typical bilge environment is extremely hostile to long term good operations of float switches which depend for their effectiveness upon the maintenance of free motion between the float member and the fixed base member.

Another pump control system which has been attempted to be utilized in the automatic control of bilge pumps comprises a pair of electrically conductive low and high water sensing probes which are appropriately positioned in the bilge, said probes being wired, through appropriate circuitry, into the power supply circuit to the bilge pump. Such a bilge pump control system is described, for instance, in U.S. Pat. No. 4,171,932, Gerald K. Miller, Oct. 23, 1979. By suitable adjustment of the high and low water sensing probes within the bilge, the bilge water, at its high level, immerses both probes, thereby establishing a low resistance bridge therebetween and causing the closure of the pump motor power supply circuit. As the pump removes water from the bilge the water level therein decreases to the point where there is ultimately attained a condition wherein neither probe is continuously immersed in the bilge water. At this point both probes signal a high resistance condition and the power supply circuit to the pump motor is opened until such time as the accumulation of water in the bilge is again sufficient to immerse both probes. Again, however, this system depends upon immersion of the sensing probes in the bilge water and, because the bilge water is usually dirty, said probes can quickly become sufficiently fouled as to markedly alter their resistance sensing properties, thereby to adversely affect their desired pump control function.

Pump control apparatuses essentially similar to those broadly described above in reference to bilge pump control are also utilized in controlling sump pumps such as are conventionally employed to remove groundwater and seepage from foundations and cellars. Such pumps are normally driven by a.c. motors. Similar problems as those outlined above also attend sump pump control operations.

In accordance with the present invention, however, there is provided a pump control apparatus which may be connected at any convenient location along the pump motor power supply circuit and which apparatus may be located in its entirety outside the immediate environment of the liquid to be pumped.

There is also provided a novel pump/pump control system or combination wherein the pump control component is physically separate and remote from the pump component, or wherein the pump control component is physically integrated with the pump component.

SUMMARY OF THE INVENTION

In accordance with an essential portion of the invention use is made of an inherent phenomenon which occurs in the operation of those liquid pumps driven by a.c. or d.c. electric prime movers. More particularly, said phenomenon resides in the fact that a number of detectable changes in an electrical condition of the prime mover power supply circuit occur in a typical operating cycle of such a pump. Said electrical condition can be the voltage or amperage flowing through the pump motor power supply circuit. Upon closing of the circuit there usually occurs an initial transient surge of electricity therethrough which is of lower voltage and substantially higher amperage than that which attends the system during the major intermediate portion of the pumping cycle. As the pump system friction is overcome and the system fills and conveys its liquid burden to the discharge thereof, the voltage through the power supply circuit to the pump motor increases and the amperage substantially decreases to levels which thereafter remain relatively static during the major intermediate portion of the pumping cycle. In the final portion of the cycle, when the pump begins to starve for liquid due to liquid exhaustion from the sump or bilge from which the liquid is drawn by the pump, the pump motor begins to run free or approaches the "no-load" condition and the pump motor supply circuit voltage increases and the amperage decreases, relative to the voltage and amperage conditions existing during the major intermediate portion of the pumping cycle.

The pump control apparatus of the invention makes use of the above-described phenomenon and broadly comprises an interval timer effective to produce an output/"on" signal at a preselected constant time interval, an electrical conditions sensing means for insertion in the pump motor power supply circuit and effective to produce an output "off" signal response to the electrical condition of the pump motor sensed upon liquid starvation of the pump, a switch for insertion into the pump motor supply circuit and a switch control circuit, said control circuit being responsive (a) to the output "on" signal of said interval timer to close said switch, and (b) to the "off" signal of said electrical condition sensing means to open said switch. In preferred embodiments of the invention, additional circuitry is provided to supply pump motor and power supply circuit protection in case of jamming of the pump and to delay activation of such protective circuitry during start up of the pumping cycle when there occurs transiently, but normally, an excessive upset of the electrical condition sensed by the electrical condition sensing means.

BRIEF DESCRIPTION OF THE DRAWING

The invention will now be described in greater detail below, reference being made to the accompanying drawing which is a schematic circuit diagram embodying the teachings of the invention and including certain preferred embodiments thereof. Included in the drawing is a schematic circuit diagram disclosing a suitable power supply circuit for use with the depicted pump control apparatus.

DESCRIPTION OF THE PREFERRED EMBODIMENTS

Referring now to the drawing, there is shown a fractional horsepower d.c. pump motor or prime mover (PM) having a conventional power supply circuit thereto. Control of pump operations is achieved by means of the depicted assemblage of the following major circuit stages: interval timer 1, inverter 3, clamp timer 5, RC buffer 21, undercurrent detector 7, overcurrent detector 9, two-input buffer 11, R-S flip-flop 13, relay driver 15 and switching relay stage 17.

Interval timer stage 1, composed of circuit elements IC1, R2-4, C3-4, produces a signal output count, through 2, which output is normally low. Accordingly, said signal output is injected into inverter stage 3, comprising circuit elements IC2A, R5-9, D2 and C5, whereby the output signal, at 4, is rendered high at start up. The timing of the intervals of the "on" signal output of the interval timer stage 1 is preselected and may be adjusted by appropriate selection of the values for circuit elements R3, R4 and C4. For bilge pump control operations it has been found that the provision of an "on" signal at intervals of about 5 minutes is usually adequate for most needs. The inverted "on" signal output of the inverter stage 3 is conducted through 4" to the set input of the R-S flip-flop stage 13, composed of circuit elements IC3C and IC3D, causing the output signal of said R-S flip-flop stage 13 to go high, thereby to trigger the relay driver stage 15 which is composed of circuit elements R16 and Q1 and to thereby cause closure of switching relay K1 of relay stage 17. Said relay stage 17 is composed of circuit elements K1 and D3. In the specific circuitry described hereinafter with respect to control of a 12 volt d.c. bilge pump, R17 is bridged, as shown, by means of a shunt 18. Where a 24 volt d.c. pump power supply circuit is involved, however, the shunt 18 is removed, placing R17 in circuit. The closure of relay K1 initiates the pumping cycle by closure of the mechanical switch elements K1' of relay K1, which elements K1' are in series connection in the power supply circuit of the pump motor PM.

The RC time constant generated by interval timer stage 1 through inverter stage 3 is conducted through 4' to the input of clamp timer stage 5, composed of circuit elements IC2B, R5, R6, R8, R9 and C5. The output of said clamp timer stage 5 is injected, through 6, into the output of the undercurrent detector stage 7 so as to briefly hold the undercurrent detector stage 7 output at zero volts from the time of the "on" signal output of interval timer stage 1. This is done in order to prevent the undercurrent detector stage 7 output from falsely signaling an undercurrent condition to the R-S flip-flop stage 13 during the period of time required for the mechanical elements K1' of relay K1 to effectuate closure of the power supply circuit to pump motor PM. The time interval at which the undercurrent detector stage 7 output is held to zero volts by the output of clamp timer stage 5 can be controlled by appropriate selection of values for circuit elements C5, R5, R6, R8 and/or R9. In general, this zero voltage output condition of the undercurrent detector stage 7 need not exceed about 2 seconds following the "on" signal of the interval timer stage 1 and can often be substantially shorter, say on the order of 1 second or even less.

An essential element of the control apparatus of the invention is an electrical condition sensing means adapted for insertion in the pump motor power supply circuit and which sensing means produces an output signal responsive to the electrical condition of the power supply circuit sensed thereby. As mentioned previously, amperage and voltage in the power supply circuit change at detectable levels in typical pump operations. Thus, any voltage or amperage sensing means whose output signal can be effectively modulated in response to these changes can be utilized in the present invention as the electrical condition sensing means. Current (amperage), however, is the preferred electrical condition for monitoring in the present invention because it is this electrical condition of the pump motor power supply circuit which tends to change most as a function of pump operating conditions during the course of a typical pumping cycle. For a representative fractional horsepower d.c. bilge pump of, say, 2500 gallons per hour pumping capacity (at open discharge), the peak start-up current in the power supply circuit may be in excess of 100 amperes, the normal current draw during the major intermediate portion of the pumping cycle may be about 12 amperes and the "no-load" pumping condition may give rise to a current draw of only about 2.5 amperes. Voltages, on the other hand, may vary over a relatively narrow range of, say one or two volts under these aforementioned conditions. Accordingly, it is preferred that the electrical condition sensing means employed in the present invention serve to sense the amperage or current in the pump motor power supply circuit and, to this end, there is shown as the electrical condition sensing element in the drawing hereof a sensor resistor element 19 located in series with the ground leg 20 of the pump motor power supply circuit. In accordance with Ohm's law, the voltage carried in ground leg 20 is dependent upon the current flowing through the sensor resistor element 19 and is utilized as the output signal to the undercurrent detector stage 7 and overcurrent detector stage 9. This signal, after passing through RC buffer stage 21, composed of circuit elements C6 and R10, is injected as an input signal, through 22, into the undercurrent and overcurrent detector stages 7 and 9. The RC buffer stage 21 serves to filter electrical noise from the signal prior to its injection into said detector stages 7 and 9 and to prevent the transient and normal overcurrent condition in the pump motor power supply circuit during the start up period of pump operations from falsely triggering the overcurrent detector stage 9 and thereby causing premature shutdown of the pump.

Undercurrent detector stage 7 is composed of circuit elements IC2D, R11, R12, R14, R15 and C7 and serves to compare the signal voltage through 22 to a set point reference voltage. It will be appreciated from the circuit diagram that the reference voltage will vary as a function of the power supply voltage to the prime mover which, in turn, will usually be dictated primarily by the condition of the prime mover power supply, such as a battery. This is a desirable feature of the control apparatus of the invention because the efficiency of a prime mover for an electrically driven pump is affected by the condition of the power supply therefor. Thus, by comparing the signal voltage of the sensor resistor 19, which is already in the power supply circuit of the pump, against a reference voltage whose value changes as a function of the condition of the prime mover power supply, there results an automatic compensation for power supply condition and the control apparatus tracks such power supply condition changes as normally occur in use with substantial accuracy. This benefit also obtains with respect to the overcurrent detector stage 9, which detector stage is described in more detail hereinafter. The nominal reference voltage set point is achieved by appropriate selection of values for circuit elements R5, R6, R11 and R12. When the signal voltage through 22 falls below the reference voltage supplied to the undercurrent detector stage 7, which condition occurs when the pump begins to run free due to exhaustion of liquid from the sump or bilge, the output signal of the undercurrent detector stage 7 goes high and this "off" signal is injected, through 8, into the two-input buffer stage 11, comprising circuit elements IC3A and IC3B, and thence through 26 into the reset input of RS flip-flop stage 13 which functions to arrest operation of the relay driver stage 15, thereby to cause opening of relay K1 and opening of the pump motor PM power supply circuit. The pump motor PM then remains inactivated until the occurrence of the next "on" signal output of the interval timer stage 1.

The overcurrent detector stage 9, composed of circuit elements IC2C, R5, R6 and R11-13, also receives the RC buffered signal voltage through 22 and compares said voltage against a selected set point reference voltage whose nominal value will be different from that for the reference voltage supplied to undercurrent detector stage 7. This set point reference voltage value is also dictated by appropriate selection of the values for circuit elements R5, R6, R11 and R12. When the input signal voltage through 22 rises above the set point reference voltage, which condition occurs when the pump becomes jammed or is otherwise impeded from free operation, the overcurrent detector stage 9 output goes high and is injected through 10, into the two-input buffer stage 11 and thence through 26 into the reset input of RS flip-flop stage 13. As in the case of the operation of the undercurrent detector stage 7, activation of the RS flip-flop stage 13 causes shutdown of relay driver stage 15 and opening of the relay K1. The pump motor PM thereafter remains inactivated until the occurrence of the next "on" signal output of the interval timer stage 1 and, until the cause of the overcurrent condition is resolved, the control apparatus of the invention will simply repetitively close switch relay K1 at each such "on" signal and protectively open said switch relay K1 through the operation of the overcurrent detector stage 9.

Apparatus of the type described has been successfully fabricated and tested in a bilge pump system utilizing the following major circuit elements.

| | |
|---|---|
| D2 | IN 4148 |
| D3 | IN 4001 |
| IC1 | CD 4060B |
| IC2 | LM 339N |
| IC3 | CD 4001 |
| K1 | Potter & Brumfield #T90 |
| Q1 | PN2222A |
| 19 | 6 Inches #18 Gauge Copper Wire, Tinned |

It will be appreciated that the suffix reference letters appearing in the text and drawing hereof in respect of integrated circuit elements IC2 and IC3 refer to the fact that electronically different portions of the same physical integrated circuit unit are employed for separate and distinct electronic functions in the apparatus of the invention specifically described hereinabove.

The 12 volt d.c. powered bilge pump utilized in the system had a rated pumping capacity of 1500 gallons per hour at open discharge and the current characteristics thereof under the varying conditions attendant a normal pumping cycle and a stalled condition were determined to be as follows.

| | |
|---|---|
| Peak Start Up Current | 55 amperes |
| Pumping Load Current | 5.1 amperes |
| No-load Current | 1.7 amperes |
| Stall Current | 55 amperes |

Based upon these operating characteristics of the pump motor and taking into account the resistance characteristics of the sensor resistor 19 utilized as the electrical condition sensing means, the nominal reference voltage supplied to undercurrent detector stage 7 was selected and adjusted to 20 mV and the reference voltage supplied to overcurrent detector stage 9 was selected and adjusted to 80 mV. The current "spike" occurring during the start up of the motor was determined to exist for an interval of about 0.1 second; thus, the RC buffer stage 21 was adapted to prevent passage of the overcurrent signal for an interval of about 0.2 second. The time of closure of the switch elements K1' of relay K1 was determined to be on the order of about 3.5 milliseconds; accordingly, the values of elements R5, R6, R8, R9 and C5 of clamp timer stage 5 were selected so as to cause a zero volt output of undercurrent detector stage 7 for a period of about 1 second taken from the time of the generation of the "on" signal of interval timer stage 1. By appropriate selections of values for elements R3, R4 and C4, the interval timer stage 1 was set for a periodicity of the "on" signal of 5 minutes.

The above system was operated successfully and the control apparatus of the invention performed to control the level of bilge water in a simulated bilge over a range of leakage rates into the bilge which could reasonably be expected to occur during normal boating operations. When water was introduced into the bilge at a rate sufficient to maintain pumping throughout a 5 minute cycle period of the interval timer 1, the pump simply continued to operate under the influence of the signal generated by the electrical condition sensing means resistor 19 until such time as the bilge was essentially exhausted of its water burden and the pump motor began to run free. Then, the signal voltage from R19 fell to below the set point value of undercurrent detector stage 7, thereby resulting in opening of relay K1 and shuting down of pump operations until the next "on" signal of interval timer 1. When the pump was stalled by mechanically jamming it, the overcurrent detector 9 operated to shut down operation well before any damage was done to the pump system or the control apparatus and, indeed, even before a protective fuse installed in the power supply circuit could operate to itself open the power supply circuit.

It should be noted that the pump control apparatus of the invention also serves to inherently and passively control the time of the inactive or "resting" period between pumping cycles. For instance, at a cycle time of "on" signals generated by the interval timer 1 of, say, 5 minutes, should the pump operate to exhaust the liquid supply within 1 minute of continuous operation the inactive period remaining before the next "on" signal will be 4 minutes. In the event that the leakage rate into the bilge or sump increases such as to cause the pump at the next cycle to operate for a longer period to exhaust the liquid therefrom, say for 2 minutes, the inactive period remaining before the next "on" signal is automatically and inherently shortened to 2 minutes. Accordingly, the resting period of a pump equipped with the apparatus of the invention is dictated and controlled by the next prior pumping cycle history of the system.

As mentioned previously, one of the advantages conferred by the arrangement of the present invention resides in the fact that pump control apparatus hereof can be electrically connected to the pump prime mover power supply circuit at substantially any convenient point therealong. Thus, the pump control apparatus can be readily located so as to be physically isolated from the liquid environment of the sump or bilge in which the pump controlled thereby is to be operated. For example, in the case of bilge pumps, the pump control apparatus of the invention can be constructed and utilized as a separate and discrete component of the pump/pump control system and can be installed in the system so as to be physically remote from the bilge and the pump component of the system. On the other hand, it can also be found advantageous, and it is specifically contemplated herein, to physically co-locate the pump control component with the pump component and thereby provide a physically integrated pump/pump control system or combination. As an example of such an integrated pump/pump control embodiment, the prime mover casing of the pump can be provided with an integral well to receive the pump control component, said prime mover casing and said well being appropriately sealed so as to prevent entry of liquid thereinto and to thereby physically isolate the pump prime mover and the pump control component from the liquid environment of the bilge. The necessary electrical connections of the pump control component (including the power supply therefor) to the pump's prime mover power supply circuit can, of course, all be accomplished internally within the sealed pump prime mover casing and/or pump control receiving well.

Obviously, many changes can be made in the pump control apparatus of the invention specifically described above without departing from the essential scope and spirit of the invention. For instance, while the foregoing description has disclosed specifics in the control of d.c. powered pumps, it is obvious that the apparatus of the invention can also be employed for control of the operations of a.c. powered pumps. In the latter instance, for example, the switch employed need not take the form of a relay but, instead, can take the form of a solid state switch such as a triac or SCR, thereby eliminating some complexity from the control apparatus of the invention.

What is claimed is:

1. Apparatus for controlling the operation of a prime mover of a pump for pumping liquids, said prime mover being driven from a power circuit, comprising a timer for timing a succession of pump "on" times at regular time intervals, a sensing resistor for sensing an electrical condition in said power circuit, said electrical condition being responsive to the pumping condition of said pump, and a control circuit for insertion in said power circuit, said control circuit being connected to enable the delivery of power from said power circuit to said prime mover at least beginning when each said "on" time occurs, and to disable the delivery of power from said power circuit to said prime mover in response to sensing of said electrical condition, and, in the absence of the sensing of said electrical condition prior to the occurrence of the next "on" time, to continue to enable said power circuit to deliver power to said prime mover without interruption until at lest the occurrence of said next "on" time, said control circuit comprising a buffer stage to filter electrical noise from said sensor resistor to reduce the delivery of transients from said resistor to said control circuit.

2. Apparatus for controlling the operation of a prime mover of a pump for pumping liquids, said prime mover being driven from a power circuit, comprising a timer for timing a succession of pump "on" times at regular time intervals, a sensing resistor for sensing an electrical condition in said power circuit, said electrical condition being responsive to the pumping condition of said pump, and a control circuit for insertion in said power circuit, said control circuit being connected to enable the delivery of power from said power circuit to said prime mover at least beginning when each said "on" time occurs, and to disable the delivery of power from said power circuit to said prime mover in response to the sensing of said electrical condition, and, in the absence of the sensing of said electrical condition prior to the occurrence of the next "on" time, to continue to enable said power circuit to deliver power to said prime mover without interruption until at lest the occurrence of said next "on" time, said control circuit comprising a mechanical relay and a circuit for temporarily delaying the response of said control circuit to said electrical current falling below said predetermined level, for a period of time following each said "on" time sufficient for said relay to close.

* * * * *